(12) United States Patent
Schulte

(10) Patent No.: US 10,336,466 B1
(45) Date of Patent: Jul. 2, 2019

(54) SYSTEM FOR EMULATING NAVIGATION SIGNALS

(71) Applicant: Garmin International, Inc., Olathe, KS (US)

(72) Inventor: Christopher E. P. Schulte, Salem, OR (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 15/980,500

(22) Filed: May 15, 2018

(51) Int. Cl.
*B64D 45/00* (2006.01)
*G08G 5/00* (2006.01)
*G01C 21/00* (2006.01)

(52) U.S. Cl.
CPC .............. *B64D 45/00* (2013.01); *G01C 21/00* (2013.01); *G08G 5/0047* (2013.01)

(58) Field of Classification Search
CPC .......... B64D 45/00; B64D 2700/62271; G08G 5/0047
USPC ........................ 340/979, 967, 971; 73/178 T
See application file for complete search history.

(56) References Cited

U.S. PATENT DOCUMENTS

| | | | |
|---|---|---|---|
| 5,323,306 A | 6/1994 | Storli et al. | 364/452 |
| 6,163,753 A | 12/2000 | Beckmann et al. | 701/213 |
| 7,216,069 B2* | 5/2007 | Hett | G01C 23/005 340/972 |
| 7,874,521 B2* | 1/2011 | Shuster | G05D 1/105 244/175 |
| 8,087,616 B2* | 1/2012 | Shuster | G05D 1/105 244/175 |
| 9,423,271 B1* | 8/2016 | Bell | G01C 23/005 |
| 2003/0132860 A1* | 7/2003 | Feyereisen | G01C 23/00 340/973 |
| 2012/0123669 A1* | 5/2012 | Shuster | G05D 1/105 701/120 |
| 2018/0068588 A1* | 3/2018 | Williams | G09B 23/187 |

OTHER PUBLICATIONS

Printout from https://en.wikipedia.org/wiki/Course_deviation_indicator dated prior to May 15, 2018.
(Continued)

*Primary Examiner* — John A Tweel, Jr.
(74) *Attorney, Agent, or Firm* — Samuel M. Korte; Max M. Ali

(57) ABSTRACT

A navigation system for emulating navigation signals for an aircraft. The navigation system comprises a global-positioning system receiver configured to determine a geographic position of the aircraft. The navigation system additionally comprises a memory configured to store position data for at least one waypoint. The navigation system further comprise an emulation system configured to compare the geographic position of the aircraft with the position data of the waypoint and to generate a composite navigation signal indicative of a relative position between the aircraft and the waypoint. The navigation system is configured to provide the composite navigation signal to a course direction indicator having an integral converter unit for decoding the composite navigation signal into a control signal that drives an indicator needle of the course direction indicator.

20 Claims, 11 Drawing Sheets

(56) References Cited

OTHER PUBLICATIONS

Printout from https://en.wikipedia.org/wiki/VHF_omnidirectional_range dated prior to May 15, 2018.
Printout from https://en.wikipedia.org/wiki/Instrument_landing_system dated prior to May 15, 2018.
Garmin G1000® Pilot's Guide for Cessna Nav III, dated Nov. 2005.

* cited by examiner

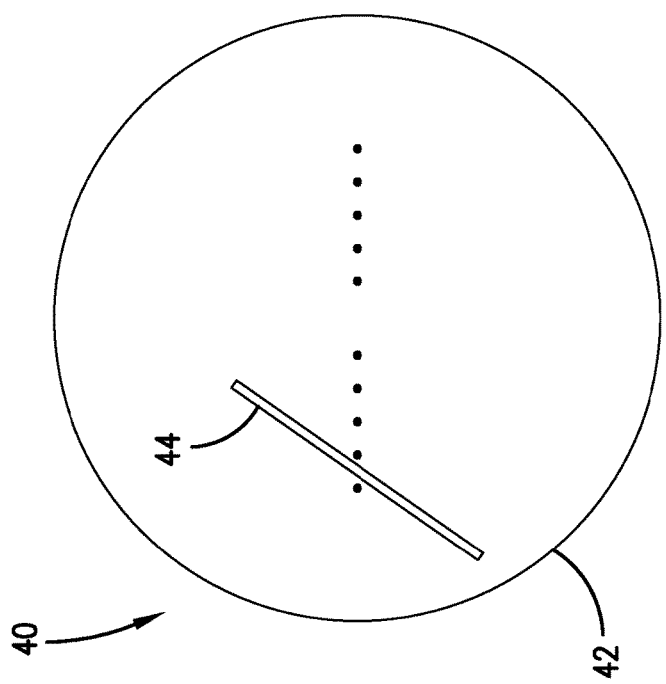
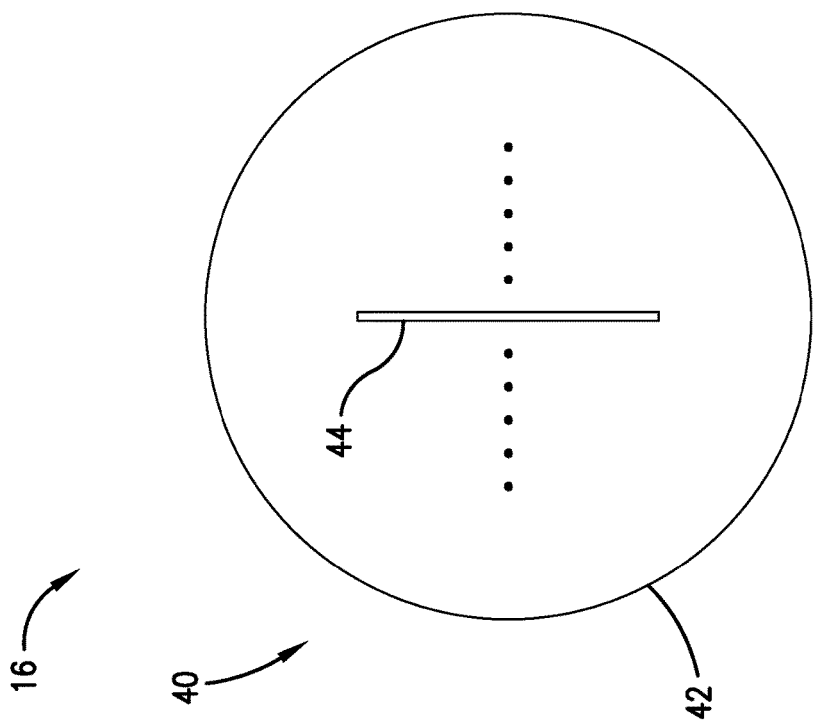

SYSTEM FOR EMULATING NAVIGATION SIGNALS

FIELD

Embodiments of the present invention are directed to systems and methods for emulating navigation signals. More specifically, the present embodiments are directed to a navigation system configured to emulate composite navigation signals that can be used to drive a course direction indicator of an aircraft.

BACKGROUND

Ground-based navigation signals for aircraft navigation have been used since the mid 1940's. Broadly, these navigation signals are carried through radio-frequency (RF) transmissions, e.g., very-high frequency (VHF) transmissions, emitted by ground stations for purposes of guiding aircraft along prescribed routes or in particular directions. Examples of short-range, local-positioning navigation systems that use such signals include VHF omni-directional radio range (VOR) systems, instrument landing system localizer (Localizer) systems, and instrument landing system glideslope (Glideslope) systems. Nearly all older-model aircraft were configured to receive navigation signals emitted from ground stations of such local-positioning navigation systems. The navigation signals could be interpreted by an aircraft's onboard instruments to provide an indication to a pilot of the aircraft as to whether the aircraft was travelling on a proper bearing or flight track. For example, VOR systems would permit a pilot to stay on a prescribed course based on navigation signals received from a network of fixed ground station. On the other hand, Localizer and/or Glideslope systems were generally used to assist a pilot in landing his/her aircraft on a runway based on navigation signals received from a fixed ground station positioned on or near the runway.

Generally, to make use of such local-positioning navigation systems, aircraft included receiver units that could receive the RF transmissions emitted by the ground stations. The receiver units were often large components installed within the aircraft, generally positioned behind the instrument panel and/or in the nose of the aircraft. The receiver units were generally configured to remove carrier signals from the received RF transmissions so that the resulting navigation signals could be sent to a course direction indicator (CDI) installed within the instrument panel of the aircraft for visual observation by the pilot. Most older (and some newer) CDIs included an integral converter unit that would decode the navigation signals obtained from the receiver unit and, based on the decoded navigation signal, drive a needle on a display unit of the CDI. CDIs with integral converter units are referred to herein as composite CDIs. Integral converter units for composite CDIs require that the navigation signals received from the receiver units be in the form of a composite navigation signal, which is a navigation signal composed of two or more individual signals.

A CDI, such as one of those described above, would generally be integrated within an aircraft's instrument panel, such that the display unit (including the needle) of the CDI would be visible to the pilot of the aircraft. Some aircraft would include multiple CDIs for each of VOR and Localizer/Glideslope systems. Alternatively, some aircraft would include a single CDI configured to function as an indicator for both VOR systems and Localizer/Glideslope systems.

The position of the needle of a CDI incorporated within an aircraft can be used to provide an indication as to whether the aircraft is in a proper position and/or is on a proper course or bearing with respect to an intended waypoint. As noted above, the position of the needle could be driven by the navigation signals embedded within the RF transmission received by the receiver unit. Specifically, the RF transmissions would generally be received by the receiver unit, which would remove the carrier signal and send the resulting composite navigation signal to the converter unit of the CDI. The converter unit could decode the navigation signal and generate a control signal, which would drive the needle of the CDI.

Given the above, a CDI would typically allow a pilot of an aircraft to select a desired course, and thereafter continuously obtain relative bearing or flight track deviation information from the CDI by observing the position of the needle of the CDI. For example, after the pilot sets a desired course, if the needle of the CDI indicates that the aircraft is positioned to the left of the intended course, the pilot can maneuver the plane towards the right until the needle is centered, which indicates that the aircraft is back on its intended course.

Area navigation (RNAV) systems, such as Global-Positioning System (GPS) systems or Long-Range Navigation (LORAN) systems, have recently begun replacing local-positioning navigations systems (e.g., VOR, Localizer, Glideslope) for aircraft navigation. GPS navigation systems began to increase in popularity in the 1990's. In the early 2000's, GPS navigation systems were approved as sole means of aircraft navigation in conjunction with Wide Area Augmentation System (WAAS).

To reduce the complexity and cost of previously-used composite CDIs, which required use of receiver units and integral converter units, RNAV systems (e.g., GPS and LORAN) allowed for the use of simplified CDIs that lacked integral converter units. These simplified CDIs would generally include just a display unit that could be configured to receive simplified information (e.g., a +/−150 my DC control signal) from a source so as to drive the needle of the simplified CDI. For instance, these simplified CDIs could be connected directly to GPS units so as to display GPS data. Alternatively, some newer local-positioning navigations system receiver units, such as for VOR, Localizer, and/or Glideslope, can incorporate integral converter units directly within the receiver units. As such, if connected to a local-positioning navigations system receiver unit with integral converter unit, a simplified CDIs can receive a control signal so as to display local-positioning navigation system data.

However, older CDIs that include integral converter units (i.e., composite CDIs) have become less prevalent in the aviation industry because most radios now include the composite converter circuitry within the RF receiver. Such composite CDIs have been left to function only in conjunction with older local-positioning navigation system receiver units, or they have been removed altogether from aircraft and deemed near valueless.

SUMMARY

Embodiments of the present invention include a navigation system for emulating navigation signals for an aircraft. The navigation system comprises a global-positioning system receiver configured to determine a geographic position of the aircraft. The navigation system additionally comprises a memory configured to store position data for at least one waypoint. The navigation system further comprise an emulation system configured to compare the geographic position of the aircraft with the position data of the waypoint and a navigation course and to generate a composite navigation signal indicative of a cross track deviation between the aircraft and the navigation course. The navigation system is configured to provide the composite navigation signal to a course direction indicator having an integral converter unit for decoding the composite navigation signal into a control signal that drives an indicator needle of the course direction indicator.

Embodiments of the present invention include a navigation system for emulating navigation signals for an aircraft. The navigation system comprises a global-positioning system receiver configured to determine a geographic position of the aircraft. The navigation system additionally comprises a memory configured to store position data for at least one waypoint. The navigation system further comprise an emulation system configured to compare the geographic position of the aircraft with the position data of the waypoint and a navigation course and to generate a composite navigation signal indicative of a cross track deviation between the aircraft and the navigation course. The composite navigation signal comprises at least a first signal tone and a second signal tone, with the composite navigation signal being configured such that either an energy difference or a phase difference between the first signal tone and a second signal tone provides an indication of the cross track deviation between the aircraft and the navigation course.

Embodiments of the present invention further include a method for emulating navigation signals for an aircraft. The method includes a step of receiving global-positioning system data to determine a geographic position of the aircraft. An additional step includes obtaining position data for at least one waypoint. An additional step includes emulating a composite navigation signal by comparing the geographic position of the aircraft with the position data of the waypoint and a navigation course. The composite navigation signal comprises at least a first signal tone and a second signal tone, with the composite navigation signal being indicative of a cross track deviation between the aircraft and the navigation course. The method further includes the step of providing the composite navigation signal to a course direction indicator having an integral converter unit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 9a is a front elevation view from an exemplary display unit of a composite course direction indicator, particularly illustrating an indicator needle being in a centered position;

FIG. 9b is a front elevation view of the display unit of the composite course direction indicator from FIG. 9a, particularly illustrating the indicator needle being in an off-centered position;

Figure 11A:
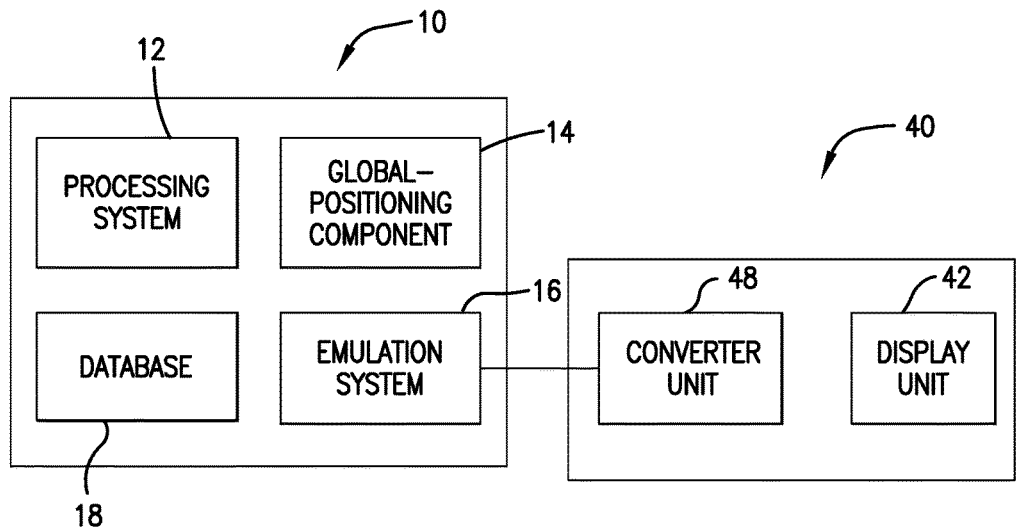
Figure 11B:
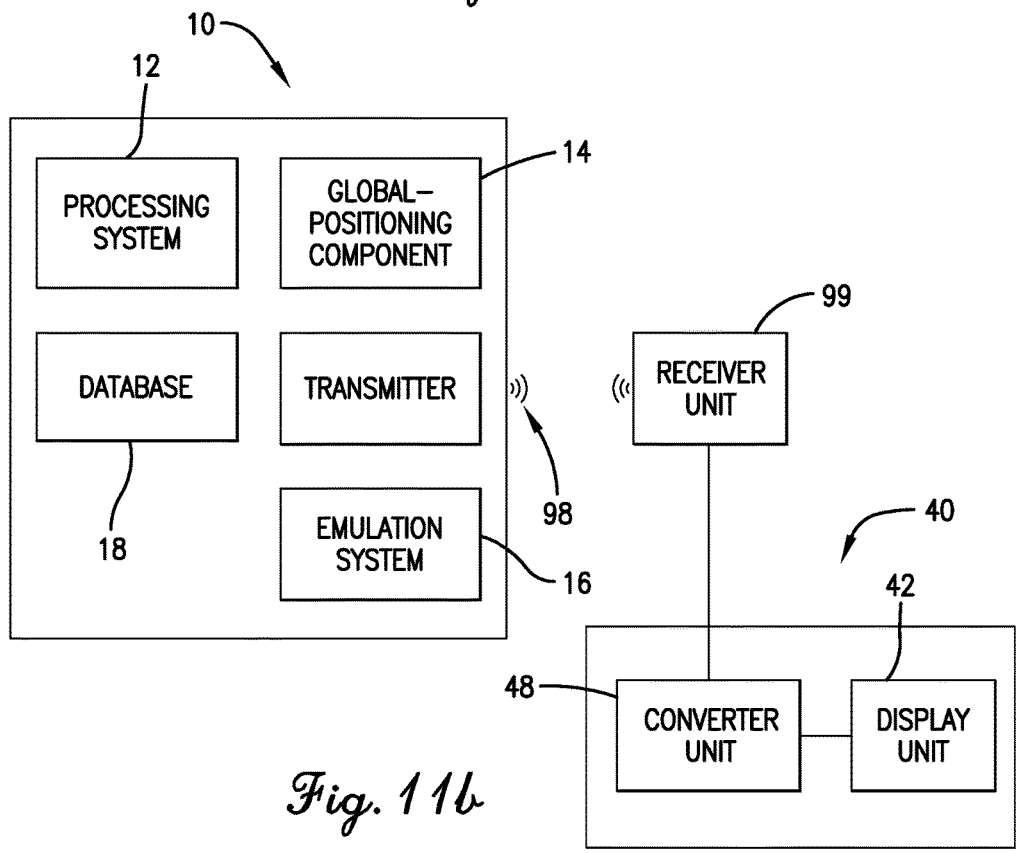

FIG. 11a is a schematic illustration of a navigation system according to embodiments of the present invention, with the navigation system being connected, via wired connection, to a composite course direction indicator; and FIG. 11b is a schematic illustration of a navigation system according to embodiments of the present invention, with the navigation system being wirelessly connected to a composite course direction indicator.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concepts can include a variety of combinations and/or integrations of the embodiments described herein.

Figure 1:
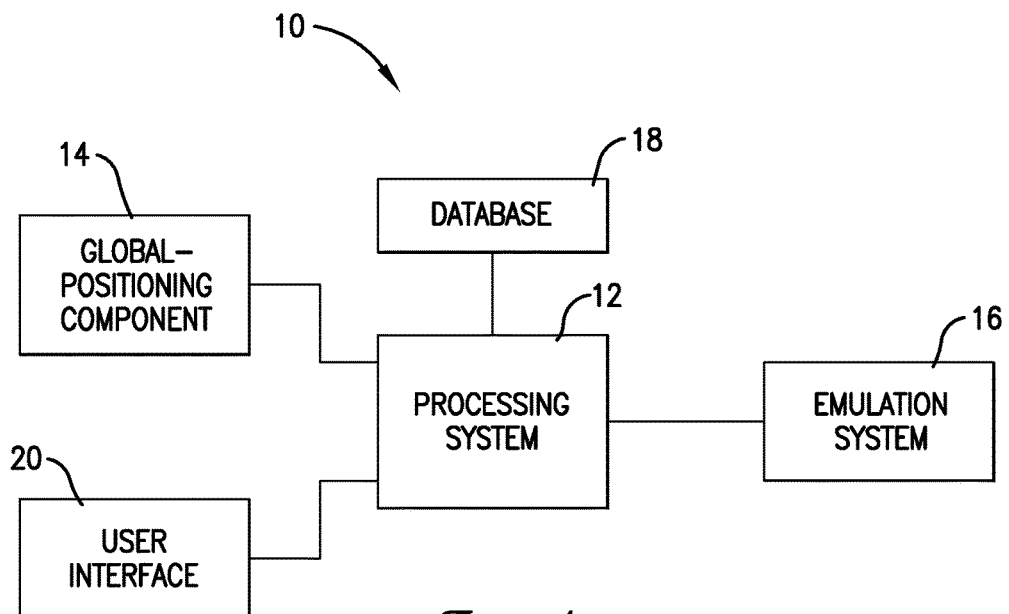
FIG. 1 is a schematic diagram of a navigation system for emulating composite navigation signals according to embodiments of the present invention.

Embodiments of the present invention provide a system and method for emulating navigation signals, such as may be used in aircraft navigation. The emulated navigation signals may be used to drive a course direction indicator (CDI) installed within an aircraft's instrument panel so that a pilot of the aircraft can obtain a visual indication of a cross track deviation of the aircraft with respect to a navigation course. A navigation system embodying principles of the present invention is illustrated in FIG. 1 and designated generally by the reference numeral 10. The navigation system 10 may comprise a processing system 12, a global-positioning component 14, an emulation system 16, a database 18, and a user interface 20. Broadly, and as will be described in more detail below, the navigation system 10 may be installed within an aircraft and used to generate emulated navigation signals based on global-positioning system (GPS) data received by the global-positioning component 14. Such emulated navigation signals may then be provided to a course direction indicator (CDI), also installed within the aircraft, so as to drive an indicator needle of the CDI to provide a visual indication to the pilot of the cross track deviation of the aircraft with respect to a navigation course. As explained below, the navigation course may be user selected, such as a desired bearing to a waypoint, for instance a bearing set using an OBS function associated with the system 10 and/or CDI. In other examples, the navigation course may be an extended runway centerline, a leg of a flight plan, combinations thereof, and the like.

Broadly, the navigation system 10 may generally be in the form of a GPS-based system, which is configured to receive GPS data and to determine and display a geographic position or bearing of the navigation system 10 based on the received GPS data. As noted above, the navigation system 10 will generally be incorporated within an aircraft, such that the navigation system 10 is configured to determine a geographic position and/or bearing of the aircraft. It should be understood that the navigation system 10 may comprise Area Navigation-based (RNAV) systems other than GPS, such as Long-Range Navigation (LORAN) systems or Inertial Navigation Systems (INS).

Turning to the elements of the navigation system 10 in more detail, the processing system 12 is generally operable to interact with the other elements of the navigation system 10. The processing system 12 may include any number of processors, controllers, or other processing systems and resident or external memory for storing data and other information accessed and/or generated by the navigation system 10. The navigation system 10 may include its own, internal electric power source, such as a battery. As such, the processing system 12 may use the power source of the navigation system 10. In some embodiments, such as when the navigation system 10 is installed within an aircraft, the navigation system 10 may be connected to an electrical system of the aircraft, such as a battery and/or alternator of the aircraft.

In accordance with some aspects of the invention, the processing system 12 may implement one or more computer programs which can execute various processes and algorithms described herein, and can control the display of information on the user interface 20, as will be described in more detail below. The one or more computer programs generally comprise ordered listings of executable instructions for implementing logical functions in the processing system 12. The one or more computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

As used herein, a "computer-readable medium" can be any means (e.g., non-transitory storage media) that can contain, store, communicate, propagate or transport computer programs for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random-access memory (RAM), a read-only memory (ROM), an erasable, programmable, read-only memory (EPROM or Flash memory), an optical fiber, and a portable compact disk read-only memory (CDROM).

The global-positioning component 14 may include a GPS receiver, a processing element, or any other device which can be used to receive and to determine geographic positions of the navigation system 10. The global-positioning component 14 may comprise, for example, a GPS receiver similar to those provided in products by GARMIN INTERNATIONAL, INC. of Olathe, Kans. The global-positioning component 14 may be configured to receive GPS, GLONAAS, Galileo, and/or BeiDou global navigation system signals.

Figure 2:
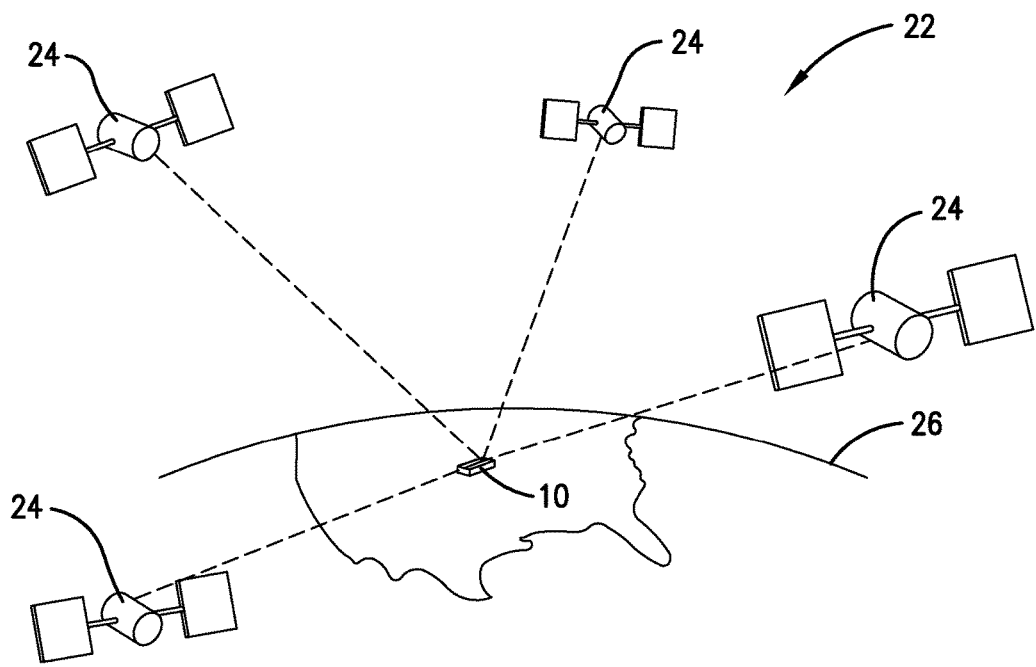
FIG. 2 is a schematic illustration of a global-positioning system used by the navigation system of FIG. 1 to determine a geographical position of the navigation system.

In general, GPS is a satellite-based radio navigation system capable of determining continuous position, velocity, time, and direction information for an unlimited number of users. As illustrated in FIG. 2, a plurality of satellites 24 are in orbit about the Earth 26. The orbit of each satellite 24 is not necessarily synchronous with the orbits of other satellites 24 and, in fact, is likely asynchronous. In embodiments in which the global-positioning component 14 of the navigation system 10 comprises a GPS receiver, the global-positioning component 14 is configured to receive GPS data, such as spread spectrum GPS satellite signals, from the various satellites 24.

GPS data is continuously transmitted from each satellite 24 and utilize a highly-accurate frequency standard based on timing from an atomic clock. Each satellite 24, as part of its GPS data transmission, transmits information indicative of that particular satellite 24. As such, if the navigation system 10 can acquire, via the global-positioning component 14, GPS data from at least four satellites, the navigation system 10 can calculate, e.g., via the global-positioning component 14 or the processing system 12, the navigation system's 10 three-dimensional position by triangulation. If the navigation system 10 is incorporated within an aircraft, the navigation system 10 can, thus, determine the aircraft's geographic position.

In view of the above, the global-positioning component 14 is operable to receive GPS data from the satellites 24 for purposes of calculating a position of the navigation system 10 based on the GPS data. The global-positioning component 14, the processing system 12, or both may also be operable to calculate a route to a desired waypoint, provide instructions to navigate to the desired waypoint, display maps and other information via the user interface 20, and to execute other functions described herein.

In some embodiments, the global-positioning component 14 may include one or more processors, controllers, or other processing systems and memory or may utilize components of the processing system 12. The memory of the processing system 12 and/or the global-positioning component 14 may store cartographic data, waypoint data, and/or routing used by or generated by the global-positioning component 14. The memory may be integral with the global-positioning component 14, integral with the processing system's 12 stand-alone memory, or a combination of both. The memory may include, for example, removable flash cards.

The global-positioning component 14 may include an internal or external antenna to assist the global-positioning component 14 in receiving signals. The antenna may be a removable quad-helix antenna or any other type of antenna that can be used with navigational devices. The antenna may be mounted directly on or in a housing of the navigation system 10 or may be mounted external to the navigation system's 10 housing, such as secured inside or exterior to the aircraft.

The emulation system 16 of the navigation system 10 may be generally operable to generate navigation signals based on the GPS data obtained by the global-positioning system 14. The emulation system 16 may include any number of processors, controllers, electronic circuit configurations, or other data-processing elements for processing data, signals, and/or other information from the navigation system 10 (e.g., GPS data) and for emulating navigation signals based on such data and information. For example, the emulation system 16 may include one or more signal generators, or other electronic components, configured to generate amplitude modulated and/or frequency modulated signals. The emulation system 16 may also include its own dedicated memory elements. In other embodiments, the emulation system 16 may share the processing elements and/or memory of the processing system 12. In accordance with some aspects of the invention, the emulation system 16 may implement one or more computer programs which can execute various processes and algorithms, as described herein. The one or more computer programs generally comprise ordered listings of executable instructions for implementing logical functions of the emulation system 16. The one or more computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

As such, the emulation system 16, via the data-processing elements, the computer programs, and/or combinations thereof, is configured to generate navigation signals that emulate navigation signals commonly generated and transmitted by local-positioning navigation systems. Specifically, the emulation system 16 may generate navigation signals in the form of composite navigation signal that includes at least two individual navigation signals that are combined to form the composite navigation signal. Examples of local-positioning navigation system signals that transmit composite navigation signals that can be emulated by the emulation system 16 include VHF omni-directional radio range (VOR) systems, instrument landing system localizer (Localizer) systems, and instrument landing system glideslope (Glideslope) systems (collectively referred to as "VOR/LOC/GS systems"). The emulated composite navigation signals may be provided to a CDI installed within an aircraft, such that the CDI can provide to the aircraft's pilot a visual indication of a cross track deviation of the aircraft with respect to a navigation course. To facilitate the providing of composite navigation signals to the CDI, the emulation system 16, and/or the navigation system 10 more generally, may comprise wired or wireless communications elements (e.g., cables, connectors, transceivers, etc.) for connection to and communicating with the CDI.

The database 18 may comprise one or more memory elements configured to store a collection of data for access by one or more computer processors, such as one or more processors associated with the processing system 12, the global-positioning component 14, and/or the emulation system 16. The database 18 may contain navigational data including, but not limited to, cartographic data, as well as geographic position data for waypoints and/or geographic locations and features on the Earth. Examples of waypoints may include, for instance, cities, landmarks, airports and runways/landing strips, and the like. The navigational data may include other relevant data related to waypoints. For example, for airport or runway-type waypoints, the navigational data stored within the database 18 may include information indictive of centerlines and designated final landing approach paths for such runways.

Figure 3A:
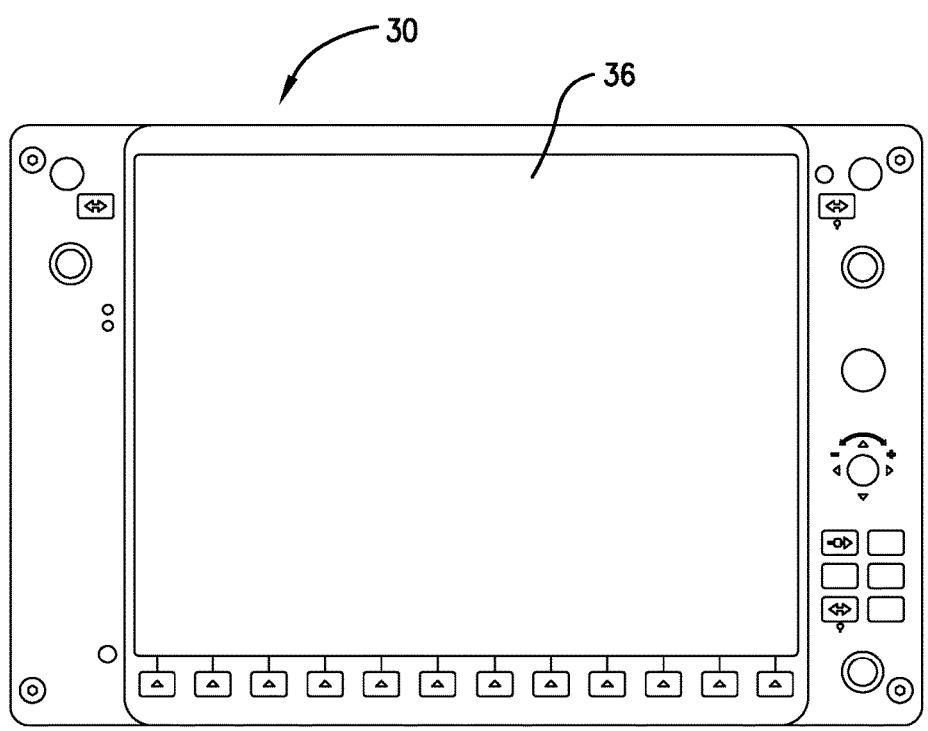
FIG. 3a is a front elevation view of a first exemplary display of a user input of the navigation system from FIG. 1.
Figure 3B:
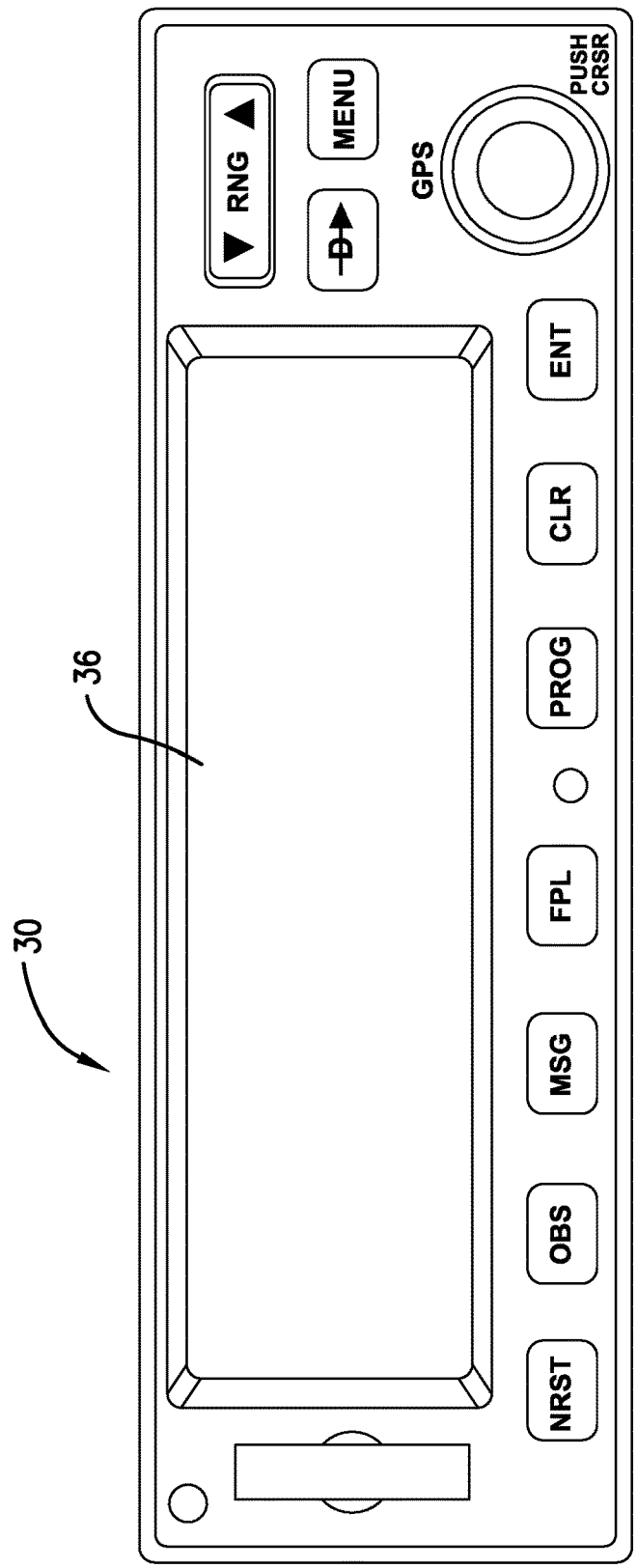
FIG. 3b is a front elevation view of a second exemplary display of a user input of the navigation system from FIG. 1.
Figure 4:
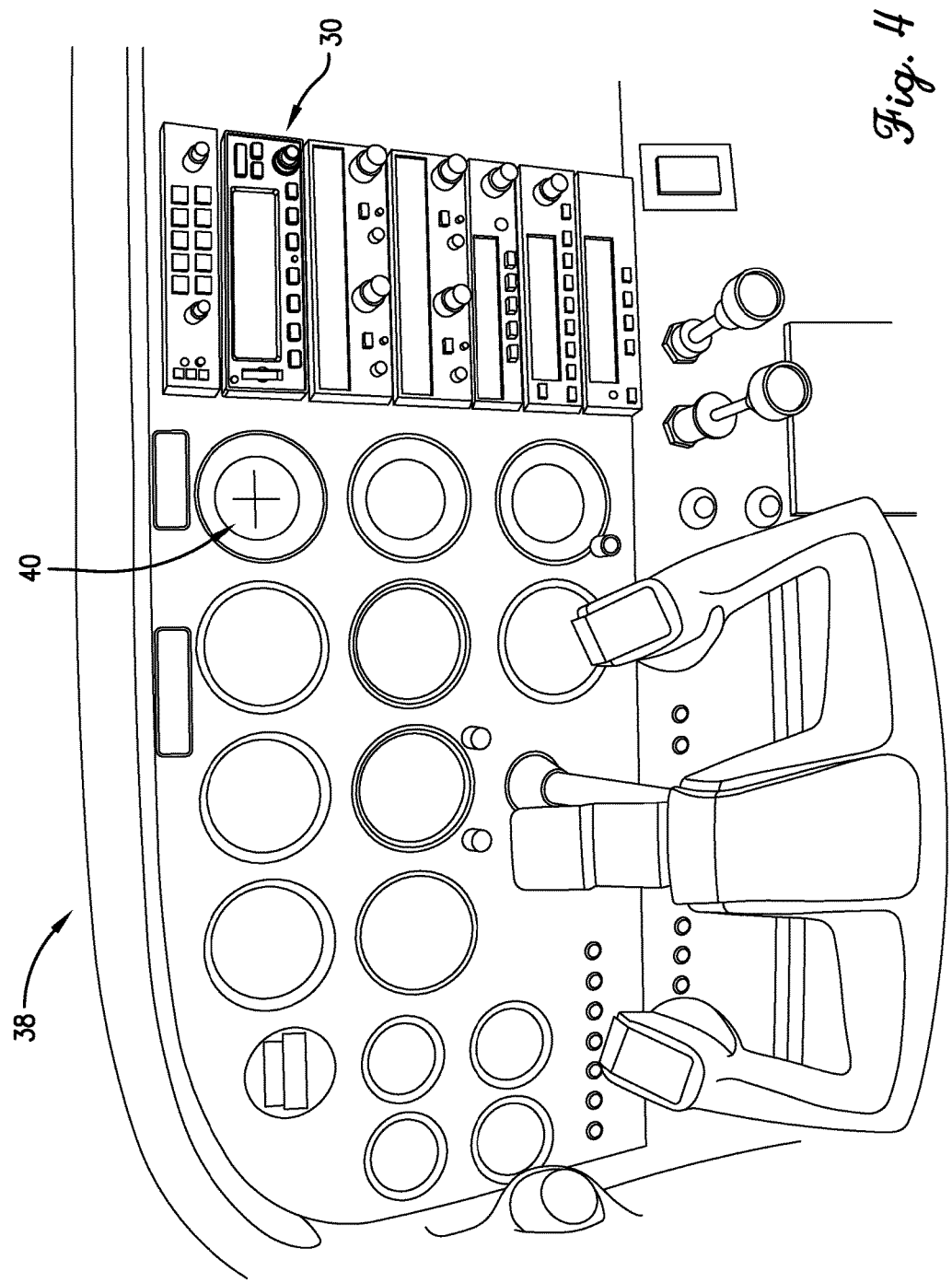
FIG. 4 is a pilot's view of an instrument panel from a cockpit of an aircraft, with the instrument panel including exemplary display from the navigation system of FIG. 1 and further including a composite course direction indicator.

The user interface 20 of the navigation system 10 is configured to enable users to interact with the navigation system 10. An exemplary user interface 20 may include one or more interactive displays illustrated in FIGS. 3A and 3B and 4. As perhaps best shown in FIG. 3B, the display 30 may include a display screen 36 and a plurality of knobs, buttons, or similar user interface elements operable to allow the user to interact with, and submit information to, the navigation system 10. The display screen 36 may include touch-screen technology in addition to or in place of the knobs, buttons, or similar user interface elements. The display 30 may be a stand-alone unit enclosing and/or otherwise containing the entire navigation system 10, designed for ease of transport between aircraft, or may be integrated into an instrument panel 38 of an aircraft 39, as illustrated in FIG. 4. The user interface 20 may include multiple displays, such as a primary flight display 30, a multi-function display, and a second primary flight display. The primary flight display 30 and the multi-function display, and the second primary flight display may present primary flight, navigation, weather, terrain, traffic, radio frequency and engine data to the user. However, in other embodiments, the user interface 20 may be configured as a panel-mount radio or navigation device like that illustrated in FIGS. 3B and 4.

Figure 5:
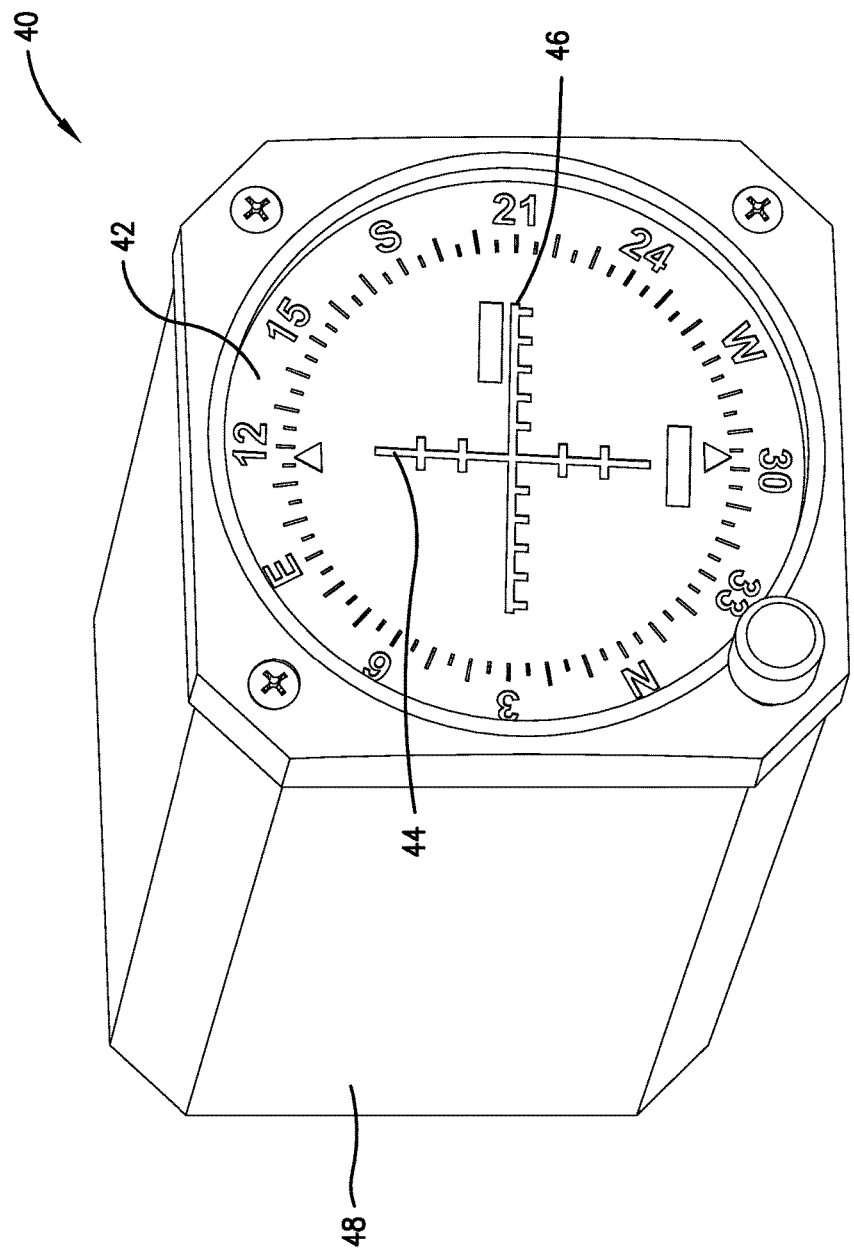
FIG. 5 is a front perspective view of a composite course direction indicator.

In standard operation, the navigation system 10 can be used to enhance a pilot's situation awareness of his/her aircraft by presenting GPS-based navigational information (e.g., position information and virtual flight-path information) to the pilot during flight. Position information is generally determined from the GPS data obtained by the global-positioning component 14, while the virtual flight path information (including the position of one or more waypoints) may be determined based, in part, on navigational data, such as cartographic data and/or waypoint data, stored in the database 18 or in other memory elements of the navigation system 10. As an example, the navigation system 10 can assist the pilot in navigating the aircraft to a waypoint. In instances when the waypoint is an airport with a runway, the navigation system 10 can further assist the pilot in landing the aircraft through the final landing approach for the runway. For examples, the navigation system 10 can provide for images or graphics to be presented on the user interface 20, with such images or graphics comprising virtual representations of geographic features in the vicinity of the aircraft and/or the runway such that the user would recognize, for example, the sky, the ground, and features on the ground such as roads, towers, mountains, and bodies of water. The user interface 20 may also provide images, references, and instructions regarding the pilot's final landing approach to the runway so as to assist the pilot in following the correct final landing approach and in landing the aircraft safely on the runway In addition to providing GPS-based navigational information to the pilot of an aircraft, the navigation system 10 of embodiments of the present invention is further configured to emulate navigation signals used by local-positioning navigation systems. As noted above, examples of local-positioning navigation systems include VOR systems, Localizer systems, Glideslope systems. The emulated navigation signals may be used to drive a CDI, and particularly a "composite CDI" 40, as illustrated in FIGS. 4 and 5, which can be integrated, along with the one or more displays as part of the instrument panel 38 of the aircraft 39. In some configurations, the CDI 40 may be integrated with the navigation system 10.

The composite CDI 40 is shown in detail in FIG. 5. As with other CDIs, the composite CDI 40 generally comprises a display unit 42 that is visible to a pilot when the composite CDI 40 is installed within an instrument panel 38 of an aircraft 39 (See, e.g., FIG. 4). The composite CDI 40 may include (1) a vertically-orientated indicator needle 44, which can be used to indicate a relative lateral position of the aircraft, and (2) a horizontally-orientated indictor needle 46, which can be used to indicate a relative vertical position of the aircraft. In contrast to other CDIs, however, the composite CDI 40 includes an integral converter unit 48, which is configured to receive a composite navigation signal and to generate a control signal for controlling the indicator needles 44, 46 based on the composite navigation signal. Thus, as used herein, the term "composite CDI" refers to a CDI with an integral converter unit 48.

As discussed previously in the above section entitled BACKGROUND, composite CDIs 40 for aircraft were originally configured to operate in conjunction with receiver units (also installed in the aircraft). The receiver units were generally associated with antennas such that the receiver units were configured to receive radio frequency (RF) transmissions from ground stations of local-positioning navigation system (e.g., VOR, Localizer, and/or Glideslope). In more detail, VOR/LOC/GS system ground stations are configured to emit RF transmissions that each comprise a carrier signal with navigation signals embedded therein. A receiver unit in an aircraft would generally be configured to receive the RF transmission from a VOR/LOC/GS system ground station and to remove the carrier signal to obtain the navigation signals. Such navigation signals could be sent from the receiver unit to the composite CDI 40, with the composite CDI 40 configured to provide a visual indication of the relative position of the aircraft with respect to the VOR/LOC/GS system ground station. As will be described in more detail below, a navigation signal obtained from the RF transmission generally comprises a composite signal of at least two alternating current (AC) waveforms (hereinafter referred to as a "composite navigation signal"). When the composite navigation signal is provided to the composite CDI 40, the integral converter unit 48 of the composite CDI 40 is configured to convert the composite navigation signal into a control signal that can be used to drive one or more of the indicator needles 44, 46 of the composite CDI 40 so as to provide a visual indication of the relative position of the aircraft with respect to a waypoint.

However, due to the prevalent use of GPS-based navigation systems, and the fact that newer VOR/LOC/GS receivers have the composite decoder built into them, many composite CDI's have been removed from aircraft. As a result, composite CDIs 40 that previously required the use of older VOR/LOC/GS receiver units have little value. Embodiments of the present invention, however, provide the navigation system 10, which is configured to emulate composite navigation signals so that composite CDIs 40 can be functional, even without the use of a VOR/LOC/GS receiver units.

Figure 6:
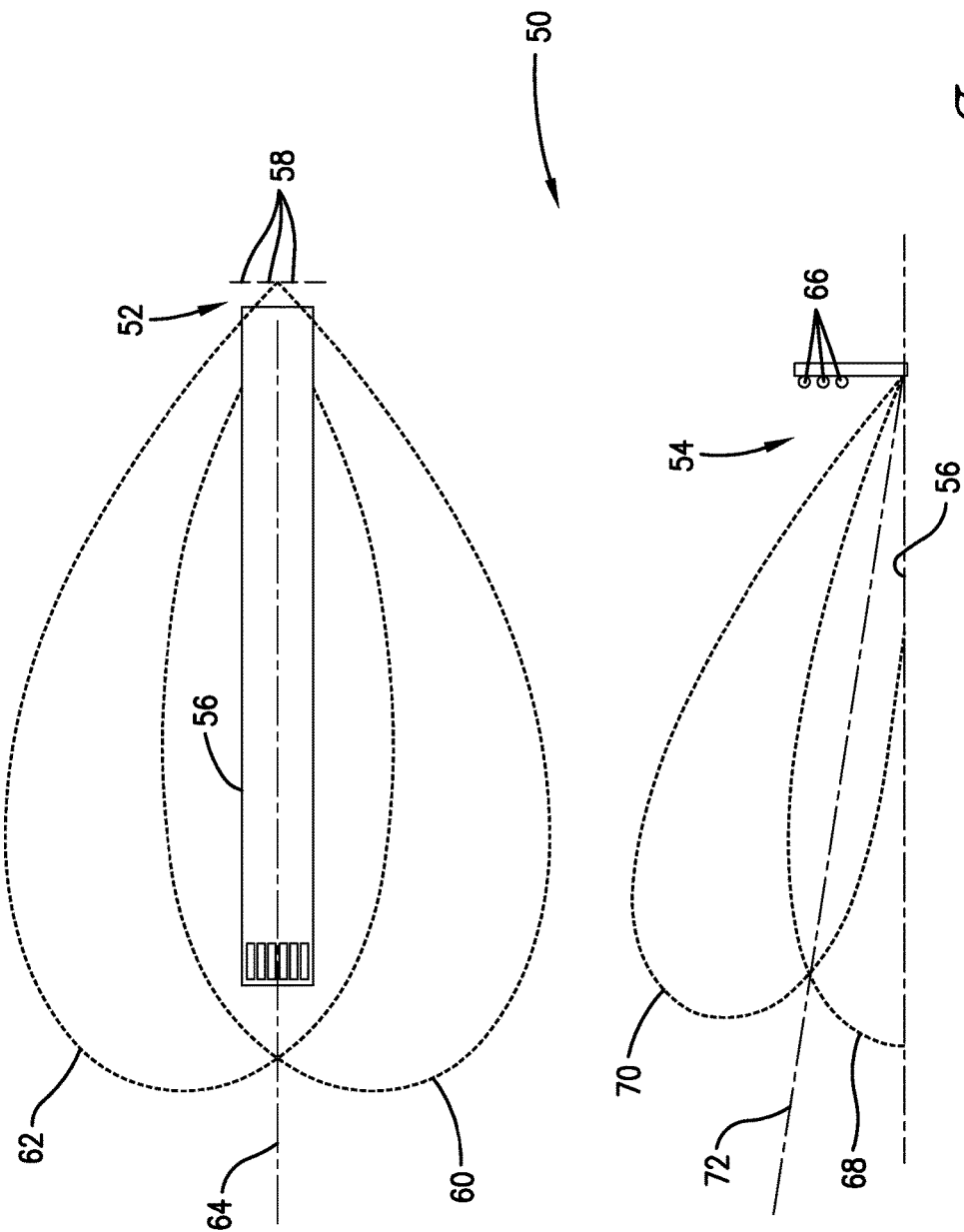
FIG. 6 is a schematic illustration of ground stations of an instrument landing system, including a Localizer subsystem and a Glideslope subsystem.

In more detail, the navigation system 10 may be configured to emulate composite navigation signals originating from VOR/LOC/GS system ground stations. For example, the navigation system 10 may emulate a composite navigation signal similar, or identical, to a signal that would normally originate from the ground station of an instrument landing system (ILS) of a runway. An ILS generally comprises both a Localizer system and a Glideslope system. As such, an ILS is configured to provide precise lateral and vertical position guidance to an aircraft approaching the runway. FIG. 6 illustrates an exemplary ILS 50 comprising a Localizer subsystem 52 and a Glideslope subsystem 54, each being positioned adjacent to an end of runway 56. The Localizer subsystem 52 is generally configured to provide lateral guidance to an aircraft approaching the runway 56, while the Glideslope subsystem 54 provides vertical guidance to the aircraft.

The Localizer subsystem 52 would generally include a plurality of pairs of directional antennas 58 placed proximate an end of the runway 56. Such directional antennas 58 are configured to generate and transmit a composite signal comprised of a first directional signal tone 60 and a second directional signal tone 62, each of which are embedded within an RF transmission emitted by the Localizer subsystem 52. Specifically, the RF transmission of the Localizer subsystem 52, in which the composite navigation signals are embedded, would generally comprise a carrier signal having a frequency ranging between 108.100 MHz and 111.950 MHz. The directional antennas 58 would normally be configured such that first signal tone 60 is directed slightly to the right of a center or centerline 64 of the runway 56 (as viewing the runway from opposite the directional antennas 58), while the second signal tone 62 is directed slightly to the left of the centerline 64 of the runway 56. The first signal tone 60 would normally comprise a tone that is amplitude modulated at a first frequency of 150 Hz. In contrast, the second signal tone 62 would normally comprise a tone that is amplitude modulated at a second frequency of 90 Hz. An aircraft flying near the runway 56 could, thus, determine its relative lateral position with respect to the centerline 64 of the runway 56 by comparing the strengths (e.g., amplitudes or energies) of the first and second signal tones 60, 62 of the composite navigation signal embedded within the RF transmission, as received by the aircraft.

In more detail and as was described in the BACKGROUND section, many older-model aircraft include composite CDIs 40, which generally require associated receiver units for operation. For instance, many older-model aircraft would include a Localizer receiver unit, which could receive RF transmissions from a Localizer ground station at a runway, such as Localizer subsystem 58 described above. The Localizer receiver unit of the older-model aircraft would be configured to remove the carrier signal from the RF transmission so as to obtain the embedded composite navigation signal (i.e., the combined first and second signal tones 60, 62). Once the composite navigation signal had been removed from the carrier signal by the receiver unit, the composite navigation signal would then be sent to the composite CDI 40, where the integral converter unit 48 could decode the composite navigation signal to determine whether the aircraft was laterally on course (or off course) with respect to the centerline 64 of the runway 56.

In more detail, because the first and second signal tones 60, 62 were configured to vary in amplitude, the converter unit 48 of the composite CDI 40 could determine a differential depth of modulation (DDM) between the first and second signal tones 60, 62 by comparing the amplitudes (or energies) of first and second signal tones 60, 62. Based on the comparison of the amplitudes of the first and second signal tones 60, 62 included in the composite navigation signal, the converter unit 48 could generate a control signal to drive the indicator needle 44 of the composite CDI 40. If the amplitude of the first signal tone 60 was equal to the amplitude of the second signal tone 62, then the aircraft was in a centered relative position (no cross-track deviation) with respect to a centerline 64 of the runway 56. As such, the control signal provided to the indicator needle 44 would be approximately zero mV DC, which would instruct the indicator needle 44 to remain centered within the display unit 42 of the composite CDI 40. In contrast, if there was a predominance of either the first signal tone 60 or the second signal tone 62 in the composite signal, such a determination would be indicative of the aircraft being out of position to the right or to the left, respectively, of the centerline 64 of the runway 56. As such, the converter unit 48 would generate a control signal between +/−150 mV DC to drive the indictor needle 44 either to the left or to the right, which would provide an indication to the pilot that the aircraft was out of position with respect to the centerline 64 of the runway 56. For instance, a control signal between zero mV DC and +150 my DC would cause the indicator needle 44 to shift towards the left of the composite CDI's 40 display unit 42 (with a control signal of +150 my DC causing a maximum leftward deflection), which was indicative of the aircraft being out of position to the right of the centerline 64 of the runway 56. Alternatively, a control signal between zero mV DC and −150 mV DC would cause the indicator needle 44 to shift towards the right of the composite CDI's 40 display unit 42 (with a control signal of −150 mV DC causing a maximum rightward deflection), which was indicative of the aircraft being out of position to the left of the centerline 64 of the runway 56.

As will be described in more detail below, the navigation system 10 of embodiments of the present invention is particularly configured to emulate composite navigation signals based on GPS data and/or on navigational data stored in the navigation system 10. Such emulated composite navigation signals can be provided to an aircraft's composite CDI 40, so as to make the composite CDI 40 functional even without the aircraft including a VOR/LOC/GS system receiver unit. In some embodiments, a switch may be utilized by the system 10 to allow a pilot to select the source for the composite CDI 40—e.g., to enable the CDI 40 to utilize either signals from VOR/LOC/GS systems or the system 10.

Remaining with the ILS shown in FIG. 6, the navigation system 10 may also be configured to emulate composite navigation signals emitted by a Glideslope system. In more detail, the illustrative Glideslope subsystem 54 of FIG. 6 would generally comprise a glideslope antenna array 66 configured to generate and transmit a composite navigation signal comprised of a first directional signal tone 68 and a second directional signal tone 70 over an RF transmission. The RF transmission, which includes the composite navigation signal, would normally be transmitted over carrier frequency in the 330 MHz range. Often, older-model aircraft would be required to have a specific Glideslope receiver unit to receive the RF transmission from the Glideslope subsystem 54. Nevertheless, the first and second signal tones 68, 70 emitted by the Glideslope subsystem 54 are similar to those emitted by the Localizer subsystem 52, except that the first and second signal tones 68, 70 are emitted at an angle with respect to the horizontal so as to provide a means of vertical guidance. Generally, the center of the composite navigation signal (the "glideslope angle" 72) is directed at three degrees above the horizontal, with the first signal tone 68 extending 0.7 degrees below the center and the second signal tone 70 extending 0.7 degrees above the center. As with the Localizer subsystem, the first signal tone 68 would generally comprise a tone that is amplitude modulated at a first frequency of 150 Hz. The second signal tone 70 would generally comprises a tone that is amplitude modulated at a second frequency of 90 Hz. By comparing the amplitudes (or energies) of the first and second signal tones 68, 70 from the composite navigation signal (e.g., by determining a DDM between the first and second signal tones 68, 70), as received by an aircraft, the vertical position of the aircraft can be determined relative to the glideslope angle 72. In general, the glideslope angle 72 corresponds with the approach slope of the final landing approach for the runway 56, such that the composite navigation signal can provide an indication of the aircraft's vertical deviation from the final landing approach (including the glideslope angle 72 and/or the approach slope) of the runway 56.

In addition to emulating composite navigation signals from an ILS, the navigation system 10 may also emulate composite navigation signals that would be emitted from a VOR system ground station. In general, VOR systems were used to provide an indication of the aircraft's relative position or bearing with respect to a waypoint. In contrast to the ILS 50 described above, which was used to provide a navigational reference with respect to a runway 56, VOR systems were generally used to provide a navigational reference with respect to one or more waypoints (e.g., ground stations) included in a network.

Figure 7:
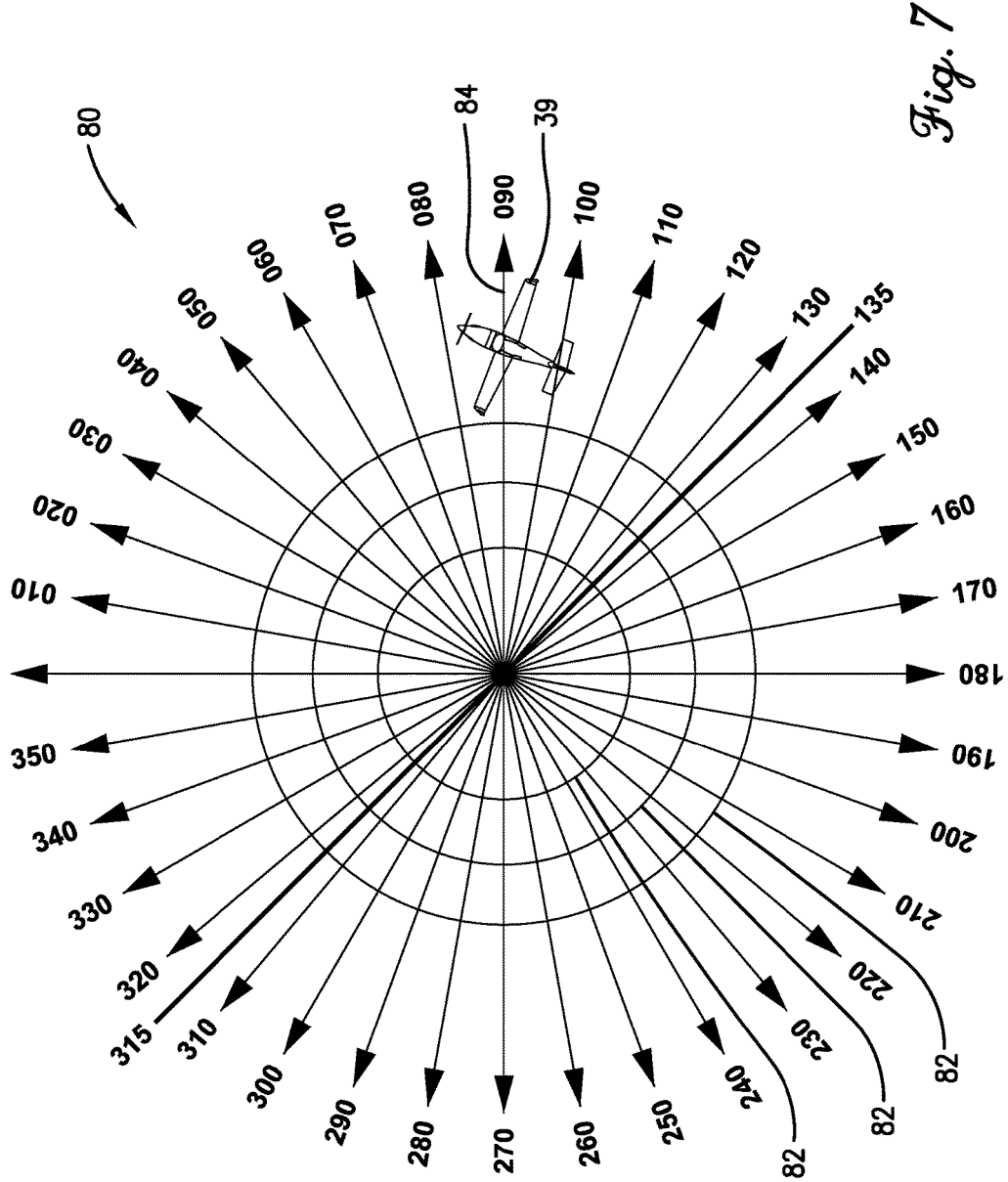
FIG. 7 is a schematic illustration of a ground station of a VHF omni-directional radio range system.

FIG. 7 illustrates a VOR ground station 80, which broadly comprises an omni-directional antenna configured to emit an omni-directional signal tone 82 and one or more directional antennas configured to emit a signal tone 84 that rotates about the ground station 80. In more detail, the VOR ground station 80 would generally be configured to generate and transmit a composite navigation signal comprised of the first signal tone 82 and the second signal tone 84 over an RF transmission. The RF transmission by which the composite navigation signal would be transmitted is normally a carrier frequency ranging between 108.000 MHz and 117.950 MHz. In addition, the first signal tone 82 would normally comprise a 30 Hz reference tone frequency modulated at 9960 Hz. In contrast, the second signal tone 84 would normally comprise a 30 Hz reference tone amplitude modulated and delayed in phase to match the azimuth angle at which the second signal tone 84 is being emitted. In more detail, the omni-directional antennas would generally be configured such that first signal tone 82 is radiated omni-directionally with respect to the VOR ground station 80. In contrast the one or more directional antennas would generally be configured to emit the second signal tone 84 such that the second signal tone 84 rotates clockwise (e.g., at thirty rotations per second) about the VOR ground station 80. Furthermore, the second signal tone 84 would normally be configured to have a variable phase that is varied in relation to the phase of the first signal tone 82. Such variability is generally configured to be a linear variability that changes with the azimuth angle at which the second signal tone 84 is emitted from the VOR ground station 80. For example, when the second signal tone 84 rotates to a transmission direction that is due north, the second signal tone 84 would be configured to be in phase with respect to the first signal tone 82. In contrast, when the second signal tone 84 rotates to a transmission direction that is ninety degrees clockwise from north (as illustrated in FIG. 7), the second signal tone 84 would be configured to be ninety degrees out of phase with respect to the first signal tone 82. By comparing the phase differences between the first and second signal tones 82, 84 of the composite navigation signal, as received by an aircraft 39, bearing information between the aircraft 39 and the VOR ground station 80 can be obtained.

In more detail, the navigation system 10 is configured to determine a geographic position of the aircraft in which the navigation system 10 is incorporated based on position information obtained and/or generated via the global-positioning component 14. In some embodiments, such position information will comprise GPS data received from GPS satellites. Regardless, the navigation system 10 is configured to emulate composite navigation signals for driving a composite CDI 40 installed in the aircraft based, at least in part, on the geographic position of the aircraft, as determined from position information obtained and/or generated by the global-positioning component 14.

In further detail, the navigation system 10 according to embodiments of the present invention is configured to obtain and/or generate position information (e.g., a geographic position) for the aircraft via the global-positioning component 14. In addition, the navigation system 10 has access to navigational data regarding plurality of waypoints, such as airports and runways, cities, geographic landmarks, or other locations on the Earth. Such navigational data may be in the form of geographic positions for the waypoints, as well as other information related to the waypoints, such as centerlines and final landing approach information for runways. The navigation system 10 may maintain such navigational data in the database 18. As such, a user may enter a destination waypoint, such as an airport into the navigation system 10, via the user interface 20. The navigation system 10 can determine, based on (1) the aircraft's current geographic position, as determined by the global-positioning component 14, and (2) the navigational data of the destination waypoint obtained from the database 18, a cross track deviation between the aircraft and the destination waypoint and a navigation course. In general, the navigation system 10 is configured to display a cross track deviation, bearing, course, and/or flight track, between the aircraft and the destination waypoint and navigation course graphically via the user interface 20. In addition, however, the navigation system 10 is further configured to generate a composite navigation signal representative of the relative position and/or bearing of the aircraft with respect to the waypoint, which can be provided to the composite CDI 40 for driving one or more of the indicator needles 44, 46 to provide a visual indication of the relative position and/or bearing of the aircraft with respect to the waypoint and the navigation course.

As an illustrative example, if a pilot of an aircraft is approaching a waypoint, in the form of a runway on which to land the aircraft, the navigation system 10 can emulate a composite navigation signal that corresponds with a navigation signal emitted from a Localizer and/or Glideslope system ground station located at the runway. Such a composite navigation signal can be emulated even if the runway does not actually have a Localizer and/or Glideslope system, and/or even if the aircraft does not include a Localizer and/or Glideslope receiver unit. The emulated composite navigation signal can be fed from the navigation system 10 to the composite CDI 40 so as to provide an indication of the aircraft's lateral and vertical position with respect to the runway. In more detail, the geographic position of the aircraft can be determined from the GPS data obtained by the global-positioning component 14 of the navigation system 10. In addition, the navigation system 10 can obtain navigational data relevant to the runway, with such navigational data including a geographic position of the runway (including a position of the centerline of the runway) and final landing approach information for the runway (including a glideslope angle 72 and/or approach slope of the runway). Such information for the runway may be obtained, for instance, from the database 18. Based on the aircraft's geographic position and the navigational data for the runway, the navigation system 10 can determine the aircraft's relative position (1) laterally with respect to a centerline of the runway, and (2) vertically with respect to the runway's final approach (which generally corresponds with the runways glideslope angle). The emulation system 16 of the navigation system 10 can, therefrom, emulate a composite navigation signal representative of the aircraft's relative position with respect to the runway, which can be provided to the composite CDI 40 so as to drive the indicator needles 44, 46 so as to give a visual indication to the pilot of the relative position between the aircraft and the runway.

Although extended runway centerlines are described above as one example of the desired navigation course, embodiments of the present invention may employ alternative or additional waypoints and associated courses. From example, a waypoint may be any location and the associated course information may be acquired from the pilot's flight plan, such as a selected route/course. Thus, embodiments of the present invention may employ emulation and course deviation information for any waypoint and course.

Figure 8:
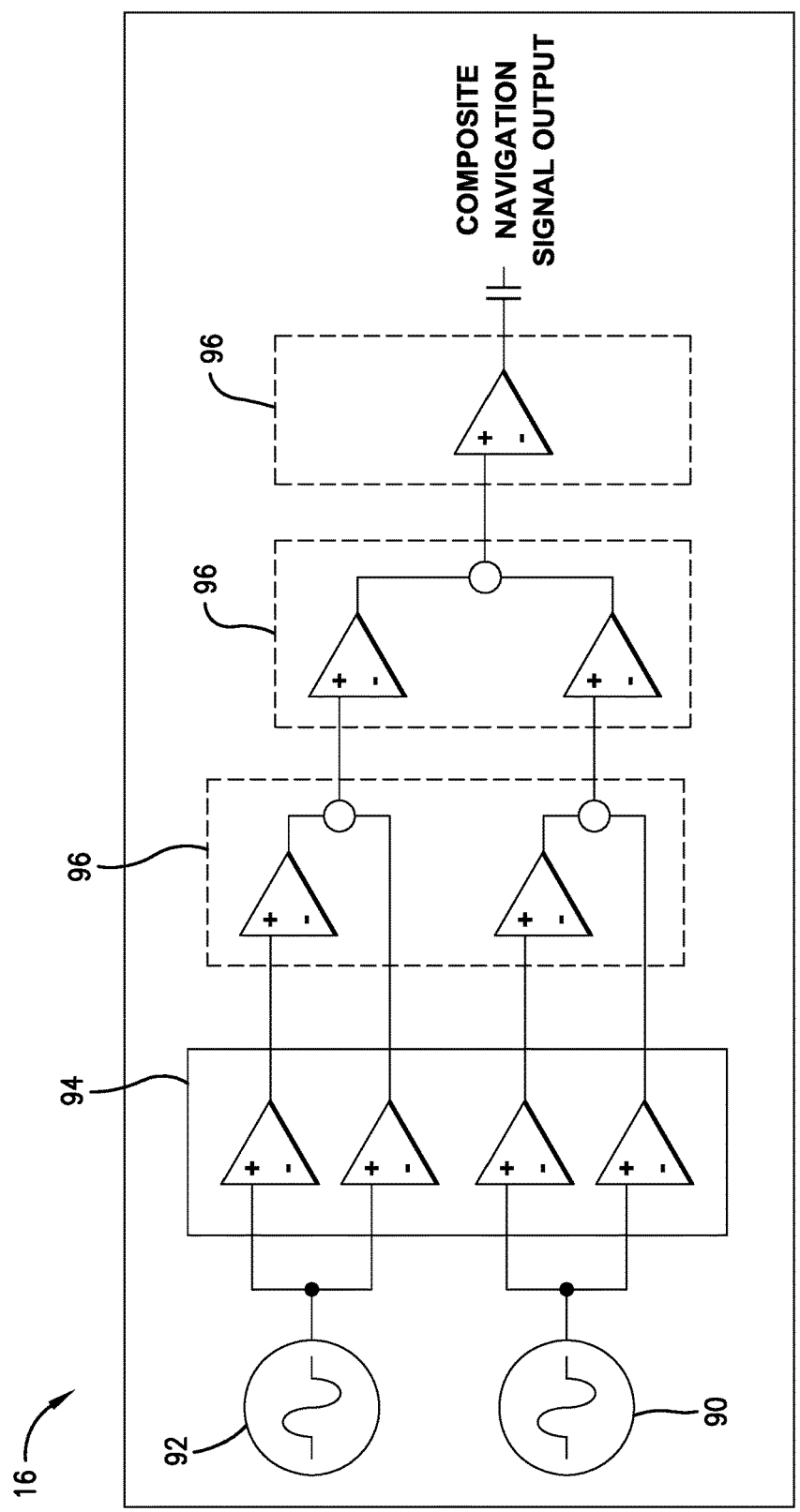
FIG. 8 is a circuit diagram of an exemplary configuration for an emulation system from the navigation system of FIG. 1.

In more detail, embodiments provide for the emulation system 16 to be configured to emulate a composite navigation signal that corresponds with the signals that would be emitted by a Localizer system ground station at the runway. Exemplary circuitry for emulating a composite navigation signal corresponding with signals emitted from a Localizer system ground station is illustrated in FIG. 8. Specifically, the emulation system 16 may include signal generators 90, 92 for generating first and second signal tones. The first and second signal tones generated by the signal generators 90, 92 of the emulation system 16 may be amplitude modulated at 150 Hz and 90 Hz, respectively. As such, the first and second signal tones generated by the emulation system 16 can be configured to correspond with the first and second signal tones 60, 62 of the Localizer subsystem 52 described above. In addition, the emulation system 16 may include a signal processing component 94 configured to attune the energy of each of the first and second signal tones provided by the signal generators 90, 92. In some embodiments, the signal-processing component 94 may comprise a digital-to-analog converter (DAC). Furthermore, the emulation system 16 may include one or more signal-combining components 96, which are configured to combine the first and second signal tones that have been attuned by the signal processing component 94 into the required composite navigation signal.

In some embodiments, the signal-combining components 96 may include electronic circuit elements that permit the first and second signal tones to be combined. In addition, some embodiments may provide for the signal-combining components 96 to include one or more operational amplifiers or other components that permit the strength of the composite navigation signal to be varied as required for use by the composite CDI 40.

In more detail, the emulation system 16 can be configured to attune, via the signal processing component 94, the first and second signal tones so that the DDM between the first and second signal tones is representative of the lateral deviation between the aircraft's geographic position with respect to the centerline of the runway. For example, if the aircraft's position is aligned with the centerline of the runway, then the first and second signal tones should be attuned to have a DDM of approximately zero, which corresponds with the first and second signal tones having equal amplitudes (or energies). In contrast, if the aircraft is off-center to the right of the runway, then the energy of the first signal tone (i.e., the 150 kHz signal tone) should be attuned to dominate over the that of the second signal tone (i.e., the 90 kHz signal tone), such that the DDM between the first and second signal tones will be shifted towards the first signal tone. If the aircraft is off-center to the left of the runway, then the energy of the second signal tone should be attuned to dominate over the that of the first signal tone such that the DDM between the first and second signal tones will be shifted towards the second signal tone.

As noted above, to accomplish such attuning of the first and second signals and, thus, configured the DDM between the first and second signals, the emulation system may use a signal processing component 94 in the form of a DAC. The first and second signal tones may be input into the signal processing component 94, such that they signal processing component 94 can attune the first and second signals as appropriate to correspond with the aircraft's relevant horizontal position with respect to the centerline of the runway. Once the first and second signal tones have been appropriately attuned to correspond with the aircraft's position, the emulation system 16 can further combine the first and second signals, via the signal-combining components 96, to generate the composite navigation signal that can be provided to the composite CDI 40.

Once an emulated composite navigation signal is generated by the emulation system 16, the composite navigation signal can be provided to the converter unit 48 of the composite CDI 40. The converter unit 48 is configured to decode the composite navigation signal, such as by analyzing the DDM between the first and second signal tones included within the composite navigation signal. Based on the decoded composite navigation signal, the converter unit 48 is configured to provide a control signal that will drive the indicator needle 44 of the composite CDI 40. For example, if the aircraft's position is aligned with the centerline of the runway, then the DDM of the composite navigation signal (i.e., the modulation depth difference between the first and second signal tones) is approximately zero. As such, the converter unit 48 would send a control signal of approximately 0 mV DC to the indicator needle 44. Such a control signal would instruct the indicator needle 44 to maintain a centered position, such as illustrated in FIG. 9a, which would indicate to the pilot that the aircraft is centered with respect to the centerline of the runway. In contrast, if the aircraft is off-center to the right of the runway, then the DDM of the composite navigation signal will indicate that the energy of the first signal tone is predominate over the energy of the second signal tone. As such, the converter unit 48 will be configured send a control signal between 0 and −150 mV DC to the indicator needle 44, which will cause the indicator needle 44 to shift to the left, as illustrated in FIG. 9b. The magnitude of the control signal will be dependent on the extent to which the aircraft is off-center. It being understood that a control signal of −150 mV DC will drive the indicator needle 44 to its maximum leftward deflection, which corresponds with the aircraft being off center a maximum amount to the right of the centerline of the runway. In contrast, if the aircraft is off-center to the left of the runway, then the DDM of the composite navigation signal will indicate that the energy of the second signal tone is predominate over the that of the first signal tone. As such, the converter unit 48 will decode the composite navigation signal and will send a control signal between 0 and +150 mV DC to the indicator needle 44, which will cause the indicator needle 44 to shift to the right. The magnitude of the control signal will be dependent on the extent to which the aircraft is off center. It being understood that a control signal of +150 mV DC will drive the indicator needle 44 to its maximum rightward deflection, which corresponds with the aircraft being off-center a maximum amount to the left of the centerline of the runway.

The navigation system 10 can be used to emulate a composite navigation signal that corresponds to a signal from a Localizer system ground station positioned near a runway, with such emulated composite navigation signal being based, in part, on the GPS data obtained from the global-positioning component 14. Such composite navigation signal can, thus, be used to drive an aircraft's composite CDI without need for a receiver unit in the aircraft. In addition, embodiments of the navigation system 10 can be used to emulate a composite navigation signal, based in part on GPS data, that corresponds to a composite navigation signal from a Glideslope system ground station positioned near a runway. Specifically, the emulation system 16 can generate a composite navigation signal that corresponds with a navigation signal emitted from a Glideslope ground station positioned near the runway. Such a composite navigation signal would generally comprise a first signal tone and a second signal tone, with such signal tones corresponding to the first and second signal tones described above with respect to the Glideslope subsystem 54. Specifically, the first and second signal tones of the emulated composite navigation signal will be configured to comprise amplitude modulated tones of 150 Hz and 90 Hz, respectively. The emulation system 16 is configured to attune the first and second signal tones so that their DDM corresponds with a vertical deviation between the aircraft and the runway's final approach (e.g., the glideslope angle 72 and/or the approach slope) to a given runway. As such, the emulated composite signal can be sent to the composite CDI 40 to provide a visual indication to the pilot of the aircraft's vertical deviation with respect to a final landing approach to a runway (e.g., as specified by the glideslope angle 72 and/or approach slope). Specifically, the converter unit 48 of the composite CDI 40 can decode the composite signal and generate a control signal that can be used to drive the indicator needle 46 upward or downward to provide an indication to the pilot as to the aircraft's vertical deviation from the final landing approach to the runway. The navigation system 10 provides for such operability to drive the composite CDI 40 even without a glideslope receiver unit in the aircraft.

In addition, embodiments of the navigation system 10 can be used to emulate a composite navigation signal, based on GPS data, that corresponds to a navigation signal emanating from a waypoint in the form of a VOR system ground station. For example, a pilot of an aircraft may select a waypoint, such as a geographic landmark or other physical location, towards which the pilot wishes to direct the aircraft. The navigation system 10, via the emulation system 16, is configured to emulate a composite navigation signal that is representative of a VOR navigation signal emanating from the waypoint. Such an emulated composite navigation signal can be generated and sent from the navigation system 10 to the composite CDI 40 to drive the indicator needle 44 so as to provide an indication to the pilot as to whether the aircraft is on or off course with respect to a course directed towards the waypoint. In more detail, the emulation system 16 of the navigation system 10 can be configured to generate a composite navigation signal that comprises a first signal tone and a second signal tone, with such signal tones corresponding to the first and second signal tones 82, 84 described above with respect to the VOR system. Specifically, the first and second signal tones of the emulated composite signal can respectively comprise a frequency modulate tone of 9960 Hz and an amplitude modulated tone at 30 Hz. The emulation system 16 is further configured to attune the phase of the second signal tone so that the phase difference between the first and second signal tones corresponds with the bearing from the aircraft to the waypoint set by the pilot. Such an emulated composite navigation signal can be sent from the navigation system 10 to the composite CDI 40, such that the composite CDI 40 can be driven to provide the waypoint bearing data. In configurations providing VOR emulation, the CDI's Omni Bearing Selector (OBS) can be adjusted by the pilot to the desired navigation course resulting in a visual indication to the pilot of the aircraft's deviation with respect to the course from the aircraft to the waypoint. Specifically, the converter unit 48 of the composite CDI 40 can decode the composite navigation signal sent from the navigation system 10 and with the CDI's OBS setting, can generate a control signal drives the indicator needle 44 of the composite CDI 40 to provide an indication as to the aircraft's course deviation (e.g., left or right deviation) to the waypoint. The navigation system 10 provides for such operability to drive the composite CDI 40 even without a VOR receiver unit in the aircraft. Instead of, or in addition to, requiring the pilot the adjust the aircraft's OBS knob, the system 10 can "prompt" the pilot to set the OBS to a desired course determined by the system 10. For example, in configurations the system 10 may be configured to receive a flight plan from the pilot and determine the desired course based on the flight plan and the current geographic location of the system 10. As the aircraft progresses along the flight plan, and passes various waypoints and associated courses, the display 36 may prompt the pilot to set the OBS to correspond the desired course currently being flown by the pilot, so that the pilot may determine deviation from that course using the CDI 40 and the functionality provided by system 10.

Figure 10:
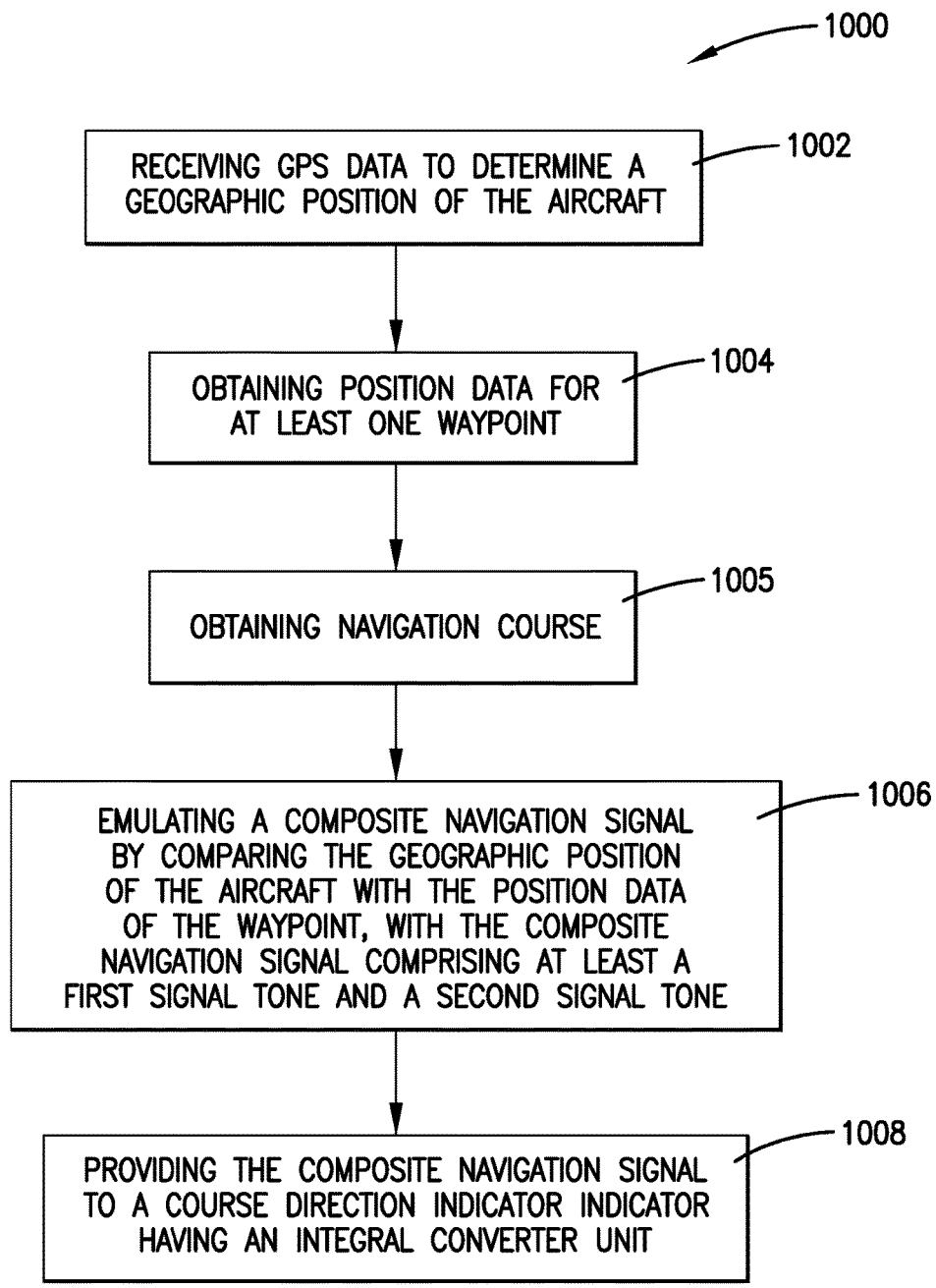
FIG. 10 is a flowchart of a method for emulating navigation signals for an aircraft according to embodiments of the present invention.

In view of the above, embodiments of the present invention include a method 1000 for emulating navigation signals for an aircraft. The method 1000 is illustrated in FIG. 10 and comprises a Step 1002 of receiving GPS data to determine a geographic position of the aircraft. An additional Step 1004 includes obtaining navigational data for at least one waypoint. An additional Step 1005 includes obtaining a navigation course, such as a desired course of navigation. In configurations, the desired course of navigation is a course from the waypoint, from which a course offset may be determined as described herein. Step 1006 includes emulating a composite navigation signal by comparing the geographic position of the aircraft with the position data of the waypoint and the desired course of navigation. The method 1000 provides for the composite navigation signal to comprise at least a first signal tone and a second signal tone, with the composite navigation signal being indicative of a relative position between the aircraft and the navigation course. Furthermore, the method 1000 includes a Step 1008 of providing the composite navigation signal to a course direction indicator having an integral converter unit.

In general, the navigation system 10 may be connected to the composite CDI 40 via a wired connection, as illustrated in FIG. 11a, such that the navigation system 10 can provide the emulated composite navigation signal to the converter unit 48 of the composite CDI 40 for driving one of the indicator needles 44, 46 included in the display unit 42 of the composite CDI 40. In some other embodiments, as illustrated in FIG. 11b, the navigation system 10 may include a wireless transmitter 98, whereby the navigation system 10 can wirelessly transmit the composite navigation signal. Specifically, the emulating system 16 may be further configured to incorporate the composite navigation signal into a carrier signal that can be transmitted as an RF transmission wirelessly from the navigation system 10 to a receiver unit 99 installed within an aircraft. Such a receiver unit 99 may comprise a receiver unit use for VOR/LOC/GS systems. In such embodiments, the receiver unit 99 can receive the RF transmission emitted from the navigation system 10 and extract the composite navigation signal from the carrier signal. Thereafter, the receiver unit 99 can provide the resulting emulated composite navigation signal to the composite CDI 40 via wired connection.

In various configurations, the system 10 is configured to modulate the composite signal up to VOR and/or ILS frequencies and mix it with a carrier frequency. In such configurations, the system 10 may be configured as portable navigation system, e.g., a hand-held GPS system such as a Garmin® Aera, that is configured with a transmitter to transmit the composite navigation signal on a frequency such as 108.10 Mhz or any other suitable frequency. Such configuration enables use of embodiments of the present invention without requiring modification to an aircraft's avionics. Thus, for an example, portable system 10 could drive the aircraft's LOC receiver, CDI, and associated autopilot system, providing enhanced functionality to the aircraft with minimal modification or cost.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A navigation system for emulating navigation signals for an aircraft, said navigation system comprising:
   a global-positioning system receiver configured to determine a geographic position of the aircraft;
   a memory configured to store position data for at least one waypoint;
   an emulation system configured to compare the geographic position of the aircraft with the position data of the waypoint and a navigation course to generate a composite navigation signal indicative of a cross track deviation between the aircraft and the navigation course; and
   a wireless transmitter coupled with the emulation system, the wireless transmitter configured to wirelessly transmit the composite navigation signal to a course direction indicator having an integral converter unit for decoding the composite navigation signal into a control signal that drives an indicator needle of the course direction indicator.

2. The navigation system of claim 1, wherein the waypoint is a runway, and wherein the composite navigation signal comprises a first signal tone and a second signal tone, with each of the first signal tone and the second signal tone being amplitude modulated.

3. The navigation system of claim 2, wherein the first signal tone is modulated at 150 Hz, and the second signal tone is amplitude modulated at 90 Hz.

4. The navigation system of claim 2, wherein the position data for the runway includes information indicative of a centerline of the runway, wherein a difference between the amplitudes of the first signal tone and the second signal tone is indicative of a relative lateral position of the aircraft with respect to the centerline of the runway.

5. The navigation system of claim 4, wherein the first signal tone and the second signal tone emulate signal tones of a localizer system from an instrument landing system.

6. The navigation system of claim 2, wherein the navigational data for the runway includes information indicative of a final landing approach for the runway, and wherein a difference between the amplitudes of the first signal tone and the second signal tone is indicative of a relative vertical position of the aircraft with respect to the final landing approach for the runway.

7. The navigation system of claim 6, wherein the first signal tone and the second signal tone emulate signal tones from a glideslope system from an instrument landing system.

8. The navigation system of claim 1, wherein the composite navigation signal comprises a first signal tone and a second signal tone, with the first signal tone being frequency modulated and the second signal tone being amplitude modulated, and wherein the second signal tone is phase shifted with respect to the first signal tone.

9. The navigation system of claim 8, wherein the first signal tone is frequency modulated at 9960 Hz, and the second signal tone is amplitude modulated at 30 Hz.

10. The navigation system of claim 8, wherein a magnitude of the phase shift of the second signal tone is dependent on a bearing between the aircraft and the waypoint.

11. The navigation system of claim 8, wherein the first signal tone and the second signal tone emulate signal tones of a very-high frequency omni-directional radio range system.

12. The navigation system of claim 1, wherein the emulation system comprises electronic circuitry for generating the composite navigation signal, wherein the electronic circuitry includes an analog-to-digital controller for attuning a first signal tone and a second signal tone, wherein the electronic circuitry is further configured to combine the first signal tone and the second signal tone to form the composite navigation signal.

13. A navigation system for emulating navigation signals for an aircraft, said navigation system comprising:
a global-positioning system receiver configured to determine a geographic position of the aircraft;
a memory configured to store position data for at least one waypoint;
an emulation system configured to compare the geographic position of the aircraft with the position data of the waypoint and a navigation course to generate a composite navigation signal indicative of a cross track deviation between the aircraft and the navigation course, wherein the emulation system is configured to incorporate the composite navigation system into a carrier signal; and
a wireless transmitter coupled with the emulation system, the wireless transmitter configured to wirelessly transmit the carrier signal as an RF transmission to a receiver unit,
wherein the composite navigation signal comprises at least a first signal tone and a second signal tone, wherein either an energy difference or a phase difference between the first signal tone and a second signal tone provides an indication of the cross track deviation between the aircraft and the navigation course.

14. The navigation system of claim 13, wherein the first signal tone and the second signal tone emulate signal tones from at least one of the following: a localizer system of an instrument landing system, a glideslope system of an instrument landing system, and a very-high frequency omni-directional radio range system.

15. The navigation system of claim 13, wherein the waypoint is a runway, and wherein the energy difference between the first signal tone and the second signal tone is indicative of a relative lateral position or a relative vertical position between the aircraft and the runway.

16. The navigation system of claim 13, wherein the navigational data of the waypoint includes a geographic position of the waypoint, and wherein the phase difference between the first signal tone and the second signal tone is indicative of a bearing between the aircraft and the waypoint.

17. The navigation system of claim 13, wherein the navigation system is configured to provide the composite navigation signal to a course direction indicator, wherein the course direction indicator is configured to decode the composite navigation signal and to send a control signal to an indicator needle of the course direction indicator, wherein the control signal is based on a comparison of the first signal tone and the second signal tone of the composite navigation signal.

18. A method for emulating navigation signals for an aircraft, said method comprising the steps of:
receiving global-positioning system data to determine a geographic position of the aircraft;
obtaining position data for at least one waypoint;
emulating a composite navigation signal by comparing the geographic position of the aircraft with the position data of the waypoint and a navigation course, wherein the composite navigation signal comprises at least a first signal tone and a second signal tone and is indicative of a cross track deviation between the aircraft and a navigation course;
incorporating the composite navigation signal into a carrier signal; and
wirelessly transmitting the carrier signal to a course direction indicator having an integral converter unit.

19. The method of claim 18, further comprising the step of receiving an instruction from a user, via a user interface, to select the waypoint.

20. The method of claim 18, further comprising the steps of adding the composite navigation signal to a carrier signal to generate a radio-frequency transmission, wherein said providing step includes wirelessly transmitting the carrier signal and the composite navigation signal to a receiver unit of the aircraft.

* * * * *